Figure 3:
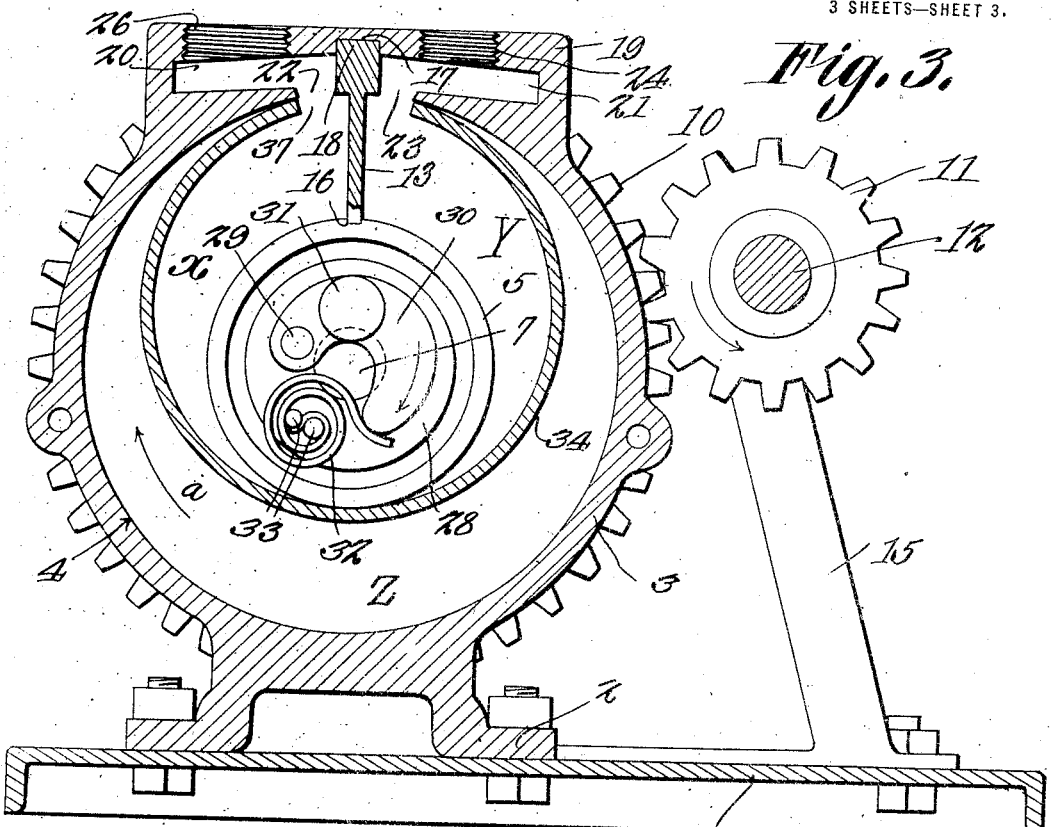

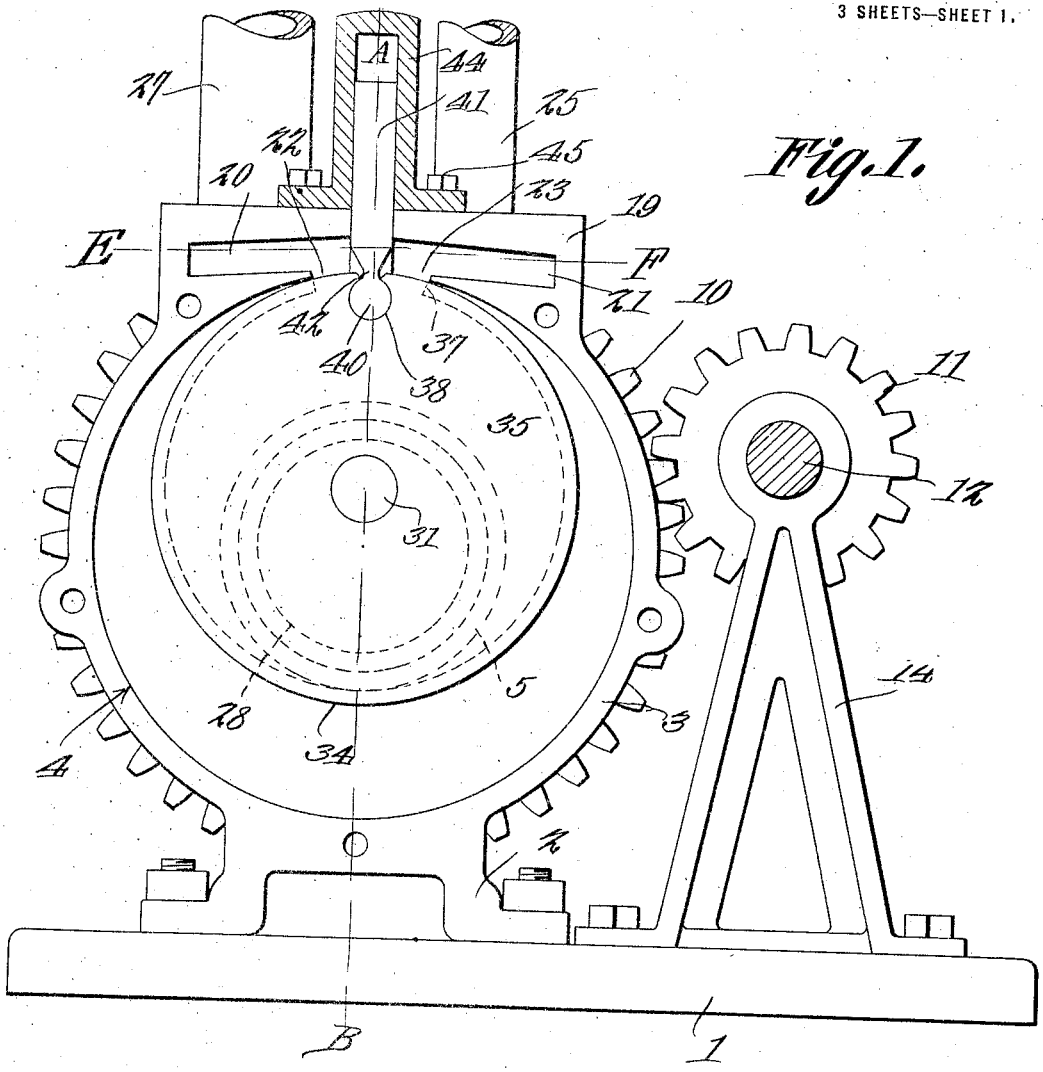
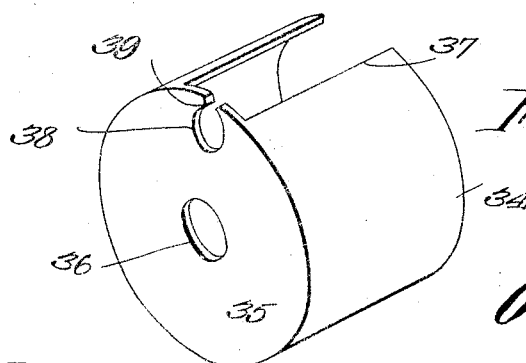

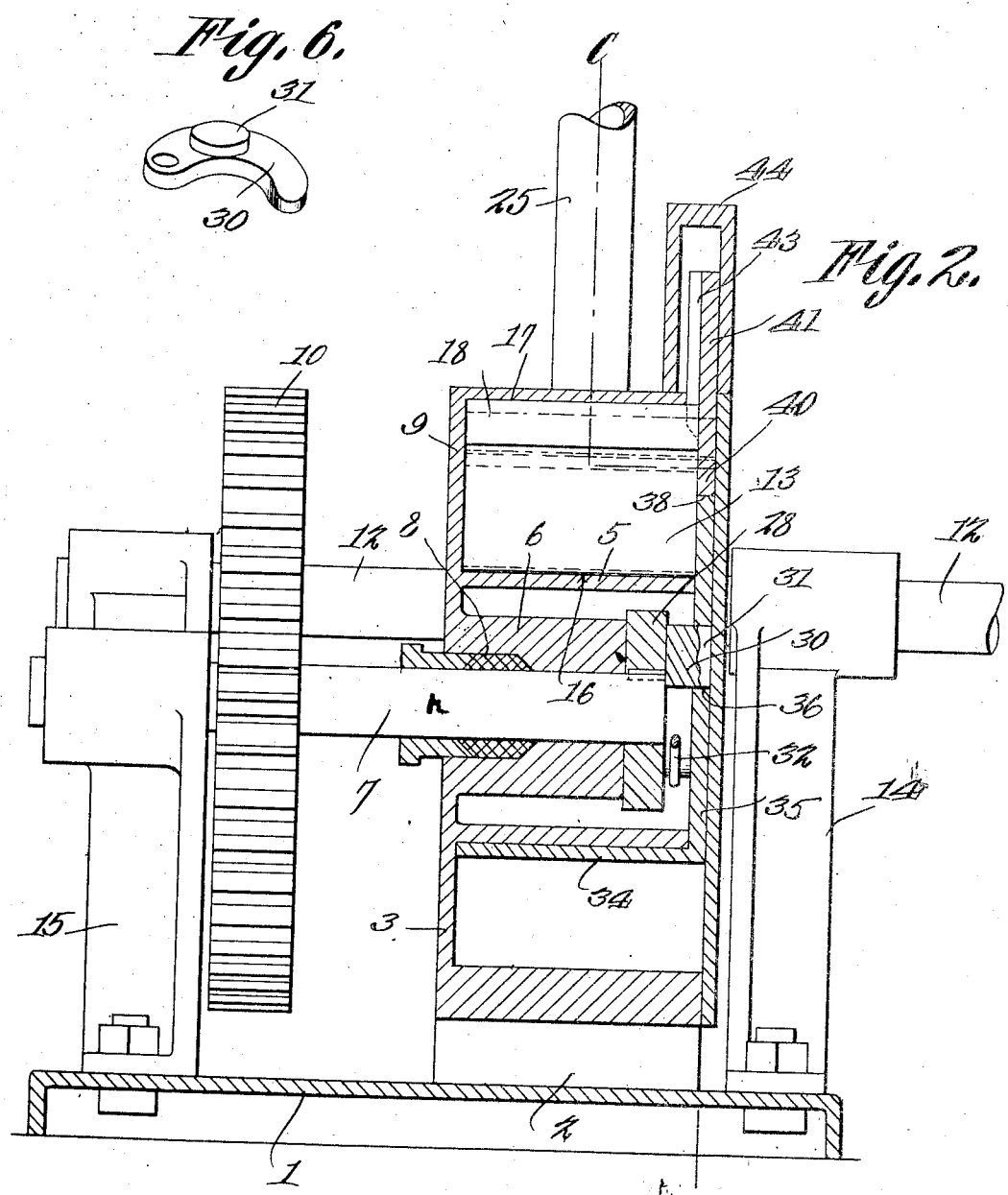

O. WENSLAY.
ROTARY PUMP.
APPLICATION FILED OCT. 22, 1915.

1,209,916.

Patented Dec. 26, 1916.
3 SHEETS—SHEET 3.

Witnesses

Ole Wenslay
Inventor,
by C.A. Snow & Co.
Attorneys.

UNITED STATES PATENT OFFICE.

OLE WENSLAY, OF ENID, OKLAHOMA, ASSIGNOR OF ONE-FIFTH TO BENJAMIN F. GILPIN, ONE-FIFTH TO CLARENCE M. COOK, ONE-FIFTH TO LAURENCE COOK, AND ONE-FIFTH TO JOHN COOK, ALL OF GARBER, OKLAHOMA.

ROTARY PUMP.

1,209,916.   Specification of Letters Patent.   Patented Dec. 26, 1916.

Application filed October 22, 1915.   Serial No. 57,308.

*To all whom it may concern:*

Be it known that I, OLE WENSLAY, a citizen of the United States, residing at Enid, in the county of Garfield and State of Oklahoma, have invented a new and useful Rotary Pump, of which the following is a specification.

This invention relates to rotary pumps of that type utilizing a piston in the form of a drum mounted for oscillation relative to a slidable abutment.

One of the objects of the invention is to provide a drum-like hollow piston having an intake of uniform width extending from one side to the other thereof whereby water entering and leaving the interior of the piston will not be subjected to the retarding influences which would be exerted by a restricted opening, but will flow freely to and from position within the piston.

A further object is to provide a novel arrangement of ports relative to the piston by means of which a continuous outflow of water from the pump is insured, the contents of the piston being expelled immediately following the discharge of the contents of the pump casing and such discharge continuing from the interior of the piston until the piston again becomes active to force liquid from the pump casing.

A still further object is to provide a pump having a novel arrangement of chambers in communication with the interior of the casing and with the intake and outflow pipes whereby better results are obtained than would otherwise be possible, said chambers, when full of water, providing water cushions whereby downflow of the columns of water in the intake and outflow pipes is momentarily halted while the discharge of water from the pump is being transferred from between the piston and the casing to between the piston and an interior abutment.

Another object is to simplify and improve upon the structure of the pump, a long bearing being provided for the piston actuating means and being located entirely within the casing of the pump so that distortion of the piston or its operating means is prevented and vibration eliminated.

A still further object is to provide improved means for housing the slidable abutment whereby leakage of water past the abutment and through the casing is prevented.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 4:
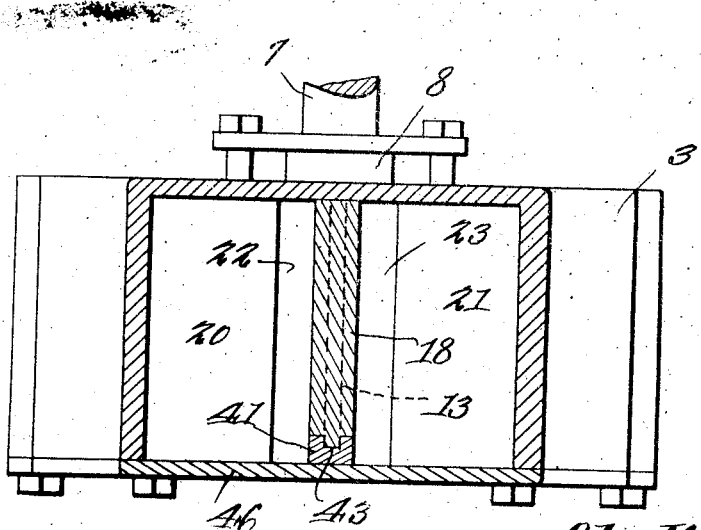

In said drawings: Figure 1 is a front elevation of the pump, the face plate being removed and the cap housing the slidable abutment being shown in section. Fig. 2 is a central vertical section through the pump, said section being taken on the line A—B Fig. 1, the drive shaft and its gear being shown in elevation. Fig. 3 is a section on line C—D Fig. 2. Fig. 4 is a section on line E—F Fig. 1. Fig. 5 is a perspective view of the piston. Fig. 6 is a perspective view of the piston engaging cam.

Referring to the figures by characters of reference 1 designates a base on which are secured the legs 2 of a pump casing 3, this pump casing having a cylindrical piston chamber 4 therein provided with a concentric wall 5 therein forming a housing for a bearing 6 which is formed integral with one head of the pump casing and extends a desired distance into the space inclosed by the wall 5. This bearing 6 is engaged by a shaft 7 and a packing gland 8 is preferably arranged in the head 9 of the casing 3 so as to prevent leakage along the shaft. Said shaft has a gear 10 secured to it and which receives motion through a gear 11 from a drive shaft 12. Said shaft 12 as well as the shaft 7 is journaled in an upstanding bearing member 15 secured on the base 1. An additional bearing member 14 may be provided for the shaft 12. It is to be understood of course that the head 9 is preferably formed integral with the wall of casing 3 and with the wall 5 and bearing 6. Extending radially from the wall 5 is a fixed abutment and guide 13 preferably in the form of a plate insertible longitudinally in grooves 16 and 17 formed in the wall 5 and in the top of the casing 3 respectively. This abutment extends from the head 9 outwardly to the end of the wall 5 and the upper end of the abutment is preferably thickened, as shown at 18.

The wall of casing 3 is enlarged at the top, as shown at 19 and has chambers 20 and 21 formed therein and extending in opposite directions from the abutment 13, these chambers extending from head 9 outwardly to the end of abutment 13 and being provided, along opposite sides of the abutment, with ports 22 and 23 respectively. These ports are of uniform width and are of the same length as the chambers 20 and 21. It will be noted that said chambers 20 and 21 are inclined downwardly away from abutment 13 thus to constitute pockets. An opening 24 is formed in the top of the chamber 21 for the reception of an intake pipe 25 while another opening 26 is formed in the top of chamber 20 for the reception of an outflow pipe 27.

Secured to that end of shaft 7 within the pump casing is a collar 28 having an outstanding stud 29 on which is pivotally mounted an arcuate cam 30 carrying a stud 31. A spring 32 is secured in any suitable manner to the collar 28 and bears at its free end against that end of cam 30 remote from the stud 31 so as thus to hold the stud 29 normally pressed outwardly from the center of the collar 28. The spring 32 is preferably secured in place by extending one end thereof between pins 33 extending from the collar 28 and disposed close together, the said spring being coiled about these pins as shown particularly in Fig. 3.

A hollow drum-like piston 34 houses the wall 5 and has a closed end 35 which fits snugly against the adjoining end of the wall 5. This end 35 of the piston has a central opening 36 into which the stud 31 projects, said stud thus constituting a bearing for the piston. A port 37 of uniform width is formed in the periphery of the piston 34 and extends from one end to the other thereof, the abutment 13 being extended through this port. Formed in the closed end 35 of the piston at the center of one end of port 37 is a circular opening 38 from which extends a slot 39 opening into the end of slot 37. Opening 38 receives a substantially circular tongue 40 formed at one end of a sliding abutment 41, there being a neck or reduced portion 42 between tongue 40 and the abutment 41 and which extends within the slot 39. Abutment 41 has a longitudinal groove 43 in the inner face thereof which receives the head of the fixed abutment 13 so that the slidable abutment is thus guided and constitutes an anchoring means for the piston. The abutment is adapted to be housed, when raised, within a cap 44 secured upon the top of the casing 3 in any suitable manner, as by means of bolts 45, this cap serving to prevent leakage from the pump of any water which might work along the abutment 41.

The width of the port 37 is substantially equal to the distance between the remote sides of the ports 22 and 23, as will be seen by referring to Fig. 3 so that, when the piston 34 is in its uppermost position, the walls of port 37 will practically register with the corresponding walls of the ports 22 and 23. When the piston is raised, it being held in elevated position by the spring pressed cam 30 and the stud 31, the lower portion of the piston will contact with the lowermost portion of the wall 5 while communication between the ports 22 and 23 and the space between the piston 34 and the casing 3 will be closed. A face plate or head 46 is secured to the casing 3 and fits snugly against the end 35 of piston 34 and against the outer face of the slidable abutment 41.

Assuming that the parts of the pump are in the positions previously described and as shown in Fig. 3 and that the shaft 7 is rotating in the direction indicated by the arrow in Fig. 3, then it will be apparent that water trapped in the space X will be expelled through the port 37 and into the port 22 for the reason that stud 31 will press the center of the piston to the right in Fig. 3, the piston rocking about the anchoring tongue 40 and swinging laterally and sliding downwardly along the inner surface of the casing 3 at the right thereof. Thus water will be drawn into the gradually enlarging space Y in piston 34 while the water previously directed into the space Z between the piston and the casing 3 will be gradually expelled in the direction of arrow $a$ in Fig. 3 and through port 22 into chamber 20 and thence into the outflow pipe 27. The piston works downwardly along the wall of casing 3 and thence upwardly therealong until it reaches its uppermost position, as shown in Fig. 3. Thus water is continuously discharged from the space Z until the piston approaches the position shown in Fig. 3. Just prior to the piston arriving at this position, the wall 5 and the inner surface of the piston coöperate to expel water from the space X with the result that as the flow is cut off from the space Z to the port 22, a stream is being expelled into the port 22 from the space X. Thus a continuous outflow of water is obtained.

Attention is called to the fact that the ports 22 and 23 are of uniform width and the same is likewise true of the port 37 so that there is no restricted opening for retarding the intake or outflow of water. It will be seen furthermore that the chambers 20 and 21 are interposed between the ports and 23 and the openings 26 and 24 re-
:ctively. These chambers are inclined
wnwardly and outwardly from the abut-
nt 13 so as to form pockets whereby a
hioning body of water is maintained in
) chambers 20 and 21 at all times, it hav-
g been found in actual practice that the
)vision of these pockets containing bodies
water, produces better results in lifting
.ter. Furthermore it allows the use of
)es 25 and 27 in communication with ports
 and 22 located close together, a structure
iich would not be feasible without the use
the chambers 20 and 21. It is necessary
at these ports be located close together as
own, as otherwise, communication between
id ports and the space Z would not be cut
: and reestablished at the proper times
iring the actuation of the piston.

Importance is attached to the particular
rangement of the bearing member 6 which
housed in the casing of the pump so that
e shaft is provided with a long bearing
eventing vibration and distortion of the
aft and shifting of the piston is prevented
hereas, should the bearing be extended
itwardly from the casing, such vibration
id shifting could not be eliminated. Fur-
.ermore by having the bearing, the wall 5
id the abutment extending from the inte-
:al head 9 of the casing, the entire pump
in be made of fewer parts, the single re-
ovable head being in the form of a plate
hich can be readily applied to or removed
om the casing 3. Such removal of the
ead 46 will not result in the disarrange-
ient of the interior or working parts of
ie pump, as would be the case should cer-
iin of the working parts be carried by the
movable head.

What is claimed is:—

A rotary pump including a casing having
an integral head and a removable head, a
concentric bearing within the casing and
formed with said integral head, a cylindrical housing formed with said integral head
and concentric with but spaced from the
bearing, a hollow drum-like piston surround-
ing said housing and having an open end
bearing against the integral head of the
casing and a closed end bearing against and
closing one end of the housing, a fixed abut-
ment radiating from the housing and bi-
secting a peripheral opening in the piston,
there being ports in said casing constantly
in communication with the interior of the
piston at opposite sides of the abutment, a
slidable abutment mounted upon the fixed
abutment and pivotally engaged by the pis-
ton, a shaft journaled within the bearing
and terminating in the space between said
bearing and the closed end of the piston, a
collar secured to said projecting portion of
the shaft, a cam pivotally mounted on the
collar, a stud projecting from the cam and
journaled within the center of the closed
end of the piston, and a spring carried by
the collar and engaging the cam to hold said
stud eccentric with the collar, said collar,
cam and spring being interposed between
the inner or free end of the bearing and the
closed end of the piston.

In testimony that I claim the foregoing
as my own, I have hereto affixed my signa-
ture in the presence of two witnesses.

OLE WENSLAY.

Witnesses:
HERBERT D. LAWSON,
R. W. HOAGLAND.